(12) United States Patent
Löhken et al.

(10) Patent No.: US 9,885,403 B2
(45) Date of Patent: Feb. 6, 2018

(54) SCREW ARRANGEMENT AND SEAT ARRANGEMENT COMPRISING A SCREW ARRANGEMENT

(71) Applicant: Stabilus GmbH, Koblenz (DE)

(72) Inventors: Lars Löhken, Bonn (DE); Ulrich Probst, Hillscheid (DE); Raphael Piroth, Koblenz (DE); Markus Müller, Koblenz (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 15/144,963

(22) Filed: May 3, 2016

(65) Prior Publication Data

US 2016/0327140 A1 Nov. 10, 2016

(30) Foreign Application Priority Data

May 4, 2015 (DE) .......................... 10 2015 208 217

(51) Int. Cl.
*A47C 3/24* (2006.01)
*F16H 25/20* (2006.01)

(52) U.S. Cl.
CPC ............... *F16H 25/20* (2013.01); *A47C 3/24* (2013.01); *F16H 2025/2075* (2013.01)

(58) Field of Classification Search
CPC ... F16H 25/20; F16H 2025/2075; A47C 3/24; A47C 3/40
See application file for complete search history.

(56) References Cited

U.S. PATENT DOCUMENTS

| 2,893,470 | A | * | 7/1959 | Peller | A47C 3/245 248/405 |
| 2,989,280 | A | * | 6/1961 | Newman | A47C 3/24 297/344.2 |
| 4,279,398 | A | * | 7/1981 | Pregnall | A47C 3/24 114/363 |
| 4,348,051 | A | * | 9/1982 | Boucher | A47C 7/506 248/405 |
| 6,026,696 | A | * | 2/2000 | Hehl | B29C 45/07 74/411 |
| 9,371,895 | B2 | * | 6/2016 | Pizzoni | F16H 25/2214 |
| 2015/0114150 | A1 | * | 4/2015 | Drennen | F16H 25/2204 74/89.23 |

FOREIGN PATENT DOCUMENTS

DE     2909867      12/1986
DE  102004046334   11/2005

OTHER PUBLICATIONS

German Search Report of DE102015208217.2 dated Feb. 8, 2016, 8 pages.

* cited by examiner

*Primary Examiner* — Philip F Gabler
(74) *Attorney, Agent, or Firm* — Rankin, Hill & Clark LLP

(57) ABSTRACT

The present invention relates to a screw arrangement (10), comprising: a drive unit (16) for introducing a torque into the screw arrangement, a drive element (24) driven in rotation about a main axis (A) of the screw arrangement by the drive unit (16) and having an external thread (30), and a driven element (12) having an internal thread (32), which is in threaded engagement with the drive element (24). The invention further relates to a seat arrangement.

14 Claims, 5 Drawing Sheets

SCREW ARRANGEMENT AND SEAT ARRANGEMENT COMPRISING A SCREW ARRANGEMENT

Figure 1A:
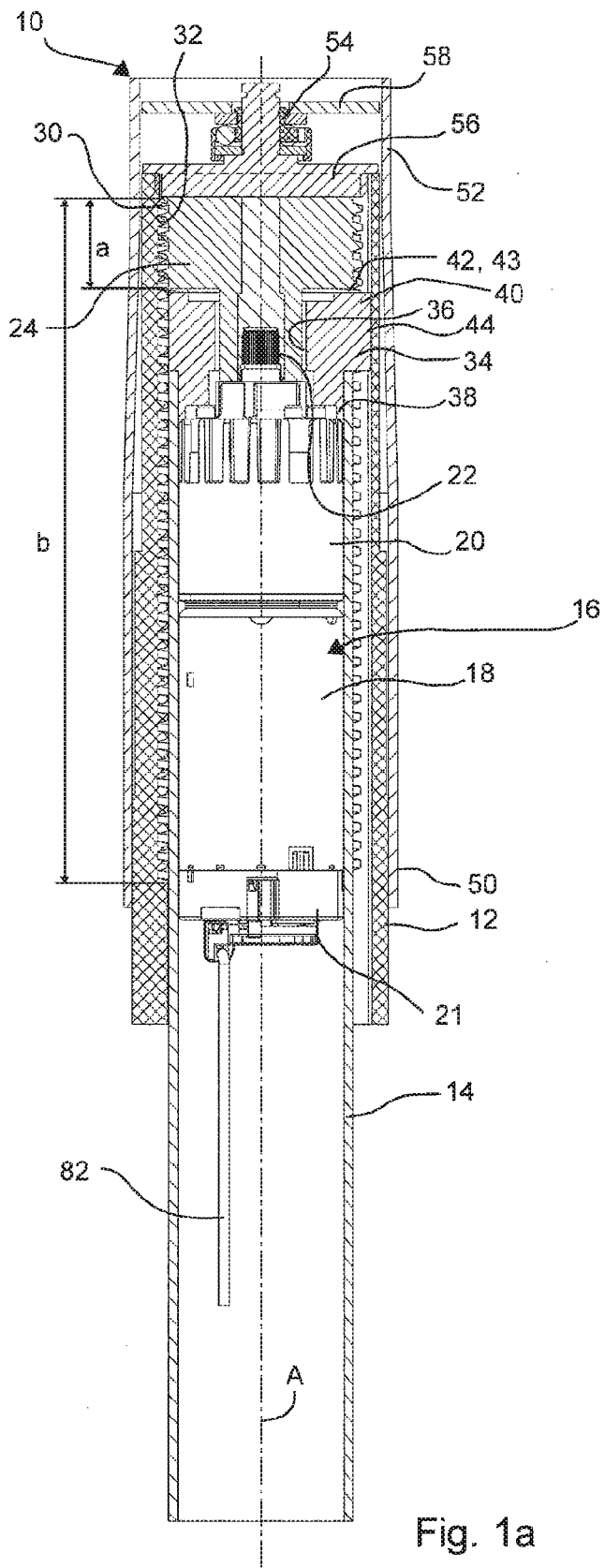

The present invention relates to a screw arrangement, comprising a drive unit for introducing a torque into the screw arrangement, a drive element driven in rotation about a main axis of the screw arrangement by the drive unit and having an external thread, and a driven element having an internal thread, which is in threaded engagement with the drive element. The present invention further relates to a seat arrangement comprising a screw arrangement of this type.

A known screw arrangement comprises an electric motor as a drive unit and a threaded spindle, driven in rotation by the electric motor, as a drive element. A threaded nut, which is part of the driven element, is screwed onto the threaded spindle. If the threaded spindle is set in rotation by the electric motor, the driven element moves in an axial direction relative to the drive unit, in such a way that a length-adjustable control element is produced.

A drawback of screw arrangements of this type is a relatively large constructional length in the axial direction of the threaded spindle, since both the spindle and the drive unit are to be arranged in succession in this axial direction. Owing to the design, the length of the threaded spindle must at least correspond to the length of the desired stroke. However, this length is further increased by the axial length of the drive unit. In most cases, the drive unit comprises an electric motor, a gear unit, a motor control system, and optionally also a chargeable or non-chargeable battery, and therefore necessarily takes up some construction space in the axial direction.

Against this background, the object of the present invention is to provide a screw arrangement which has a low axial constructional length and simultaneously has sufficient or increased maximum stroke.

In a first aspect of the present invention, in order to achieve the object set out above, a screw arrangement of the aforementioned type is provided in which the axial extension of the internal thread of the driven element is greater than the axial extension of the external thread of the drive element. This achieves the effect that the stroke of the screw arrangement is no longer determined by the axial length of the drive element, but instead by the axial extension of the internal thread of the driven element. Accordingly, the axial length of the drive element can be reduced, and the constructional unit consisting of the drive unit and the drive element can be shortened in the axial direction, without the stroke of the screw arrangement being reduced as a result.

At this juncture, it is noted that the term "thread" in the present disclosure means any control curve mechanism suitable for forcibly converting the rotational movement of the drive element into an axial movement of the driven element or into a movement of the driven element at least having an axial component. Thus, a helical path which does not extend fully around the main axis is also considered a "thread" within the meaning of this disclosure. For example, a thread may in particular also be produced by a single projection engaging in a single helically extending groove. Furthermore, threads within the meaning of the present disclosure may have different leads, in such a way that a greater axial offset per angle of rotation of the drive element occurs in a first movement portion than in a second axial portion. In this way, the speed of the axial shortening or lengthening of the screw arrangement can vary depending on the axial position of the drive element in relation to the driven element.

Preferably, in a contracted state of the screw arrangement, the drive unit is received, at least in part, inside the driven element and enclosed, at least in part, by the internal thread of the driven element. The drive unit may even advantageously be fully received inside the driven element and fully enclosed by the internal thread of the driven element. In this way, it is possible for the driven element and the drive unit to overlap in the axial direction, in such a way that the axial length of the screw arrangement in the contracted state is reduced.

In principle, it is conceivable for the drive element to be fixed or provided directly on a drive shaft of the drive unit, in such a way that the drive element is driven directly by the drive unit. However, so as to decouple axial impact forces and vibrations from the drive unit and prevent damage to the drive unit, it is proposed for the drive element to be coupled to the drive shaft at which the drive unit provides the torque thereof so as to transfer torque but be axially displaceable, and for a damping/suspension element, having a damping and/or suspension effect at least in the axial direction, to be arranged between the drive element and the drive shaft. The screw arrangement thus simultaneously also performs a damping or suspension function.

In a further preferred embodiment, the drive element can be braced on a support portion in the axial direction, the support portion being axially fixed with respect to a housing of the drive unit or being formed by a housing of the drive unit or being formed on a drive-side tube body which receives the drive unit. A configuration of this type prevents an external force which acts in the axial direction, for example a gravitational force acting in the contraction direction, from being introduced into the drive unit via the drive element and thus being able to cause damage to the drive unit. Instead, a force of this type is braced on the housing of the drive unit or on a drive-side tube body by means of the support portion. So as to ensure unproblematic rotation of the drive element even in the unloaded state, an axial bearing, for example a slide bearing, may be provided between the drive element and the support portion and/or between the support portion and the housing or drive-side tube body.

In a further preferred embodiment of the present invention, a housing of the drive unit may be coupled to the driven element so as to be rotationally engaged but axially displaceable. This results in a purely axial displacement between the drive unit and driven element, and prevents the driven element from rotating together with the drive element as a result of friction between the internal thread and the external thread. In other words, in this embodiment, the screw arrangement is torque-free during operation.

The torque-free coupling between the drive unit and the driven element may be produced by way of at least one projection which is connected rotationally engaged with the housing of the drive unit or a drive-side tube body and is guided in at least one axial groove of the driven element. A positive guidance of this type is particularly reliable and simple to produce. In particular, the axial groove may intersect the internal thread of the driven element, in other words extend on the internal circumference of the driven element. Increased reliability of the linear guidance is achieved if a plurality of axial grooves are provided on the inside of the driven element, which extend separated from one another by equidistant angular distances, and if a corresponding number of projections are provided which are rotationally engaged with respect to the housing or drive-side tube body, in such a way that a projection engages in each of the axial grooves.

If a screw arrangement comprises both the above-disclosed support portion and the above-disclosed at least one projection, in order to save on components and to further reduce the axial length of the screw arrangement, it is particularly advantageous for the support portion and the projection to be formed on a common control body arranged axially between the drive unit and the drive element. In this case, a control body of this type may in particular comprise a through-opening, through which a drive shaft passes, at which the drive unit provides the torque thereof, in such a way that the construction space in the vicinity of the drive shaft can be used particularly efficiently.

In a further embodiment of the present invention, the drive unit may comprise an electric motor. Furthermore, the drive unit may preferably comprise a gear unit, for example a reduction gear unit, which converts the rapid rotation of the electric motor into a slower rotation of the drive element. The drive unit may further comprise a rechargeable or non-rechargeable battery for providing electrical energy in order to drive the electric motor, in such a way that particular mobility of the screw arrangement is achieved. Alternatively, a terminal for an external power supply may be provided. Furthermore, the drive unit preferably comprises a control unit for the electric motor.

For easier handling and assembly, all aforementioned elements of the drive unit may be interconnected to form a module, in particular a self-supporting module, which can be handled as a unit.

The drive unit may advantageously be accommodated in a drive-side tube body, in such a way that it is protected from mechanical influences and environmental influences and is not visible from the outside. The tube body may preferably be closed in a dust-proof manner so as to increase the service life of the drive unit.

The drive-side tube body may have externally accessible electric contacts for actuating and/or powering the drive unit. This makes it easier to install the screw arrangement according to the invention in a superordinate device.

The driven element may also comprise a driven-side tube body or be formed by a tube body of this type. In this case, the drive-side tube body and driven-side tube body can be inserted into one another, in particular the drive-side tube body being received inside the driven-side tube body. The axial overlap between the tube bodies may preferably also still be provided even in the completely extracted state of the screw arrangement, meaning that good bracing against tilting between the two tube bodies is ensured and also that a substantially fully closed tube system can be formed, in such a way that movable parts and in particular also the drive unit are accommodated fully inside this tube system in a protected manner.

In principle, the screw arrangement according to the present invention may be used broadly as a length-variable control element for various lifting devices or control devices. In a particularly preferred application, the screw arrangement according to the invention is used for adjusting the seat height of a seat arrangement. For this purpose, the screw arrangement may comprise, on the drive-side portion and/or on the driven-side portion, fixing means which make it possible to fix the portion in question to a seat or to a base of a seat arrangement. In particular, in this context, it is conceivable that a driven-side tube body which forms the driven element and/or a drive-side tube body in which the drive unit is accommodated may have conical tapering. This achieves the technical effect that the screw arrangement is set up to be inserted into a corresponding recess in a seat or a base of a seat arrangement, the internal dimension of the recess being larger than the smallest diameter of the conical tapering but smaller than the largest diameter of the conical tapering. The screw arrangement can thus fit in the recess of the seat arrangement in a force fit, stable connection being maintained merely due to the gravitational force on the elements involved, in particular in the case of a vertically arranged screw arrangement.

Proceeding from this idea, independent protection is claimed for a seat arrangement, comprising a seat height adjustment means which has a screw arrangement according to the above-disclosed invention. By activating the drive unit, the screw arrangement can thus be contracted or extracted and bring about seat height adjustment.

In particular, a seat arrangement of the type having a single vertical central column is conceivable. This type is known in particular from height-adjustable swivel chairs and office chairs. In seat arrangements of this type, substantially the entire gravitational force introduced via a seat of the seat arrangement is to be received by the central column. In a preferred embodiment of the invention, this central column can thus be formed by a screw arrangement of the above-disclosed type.

In addition to the use as a seat height adjustment device of a seat arrangement, the screw arrangement according to the present invention may also be used as a control element in a plurality of other devices and installations, and generally take on the function of a linear motor for positioning any desired elements.

Figure 1B:
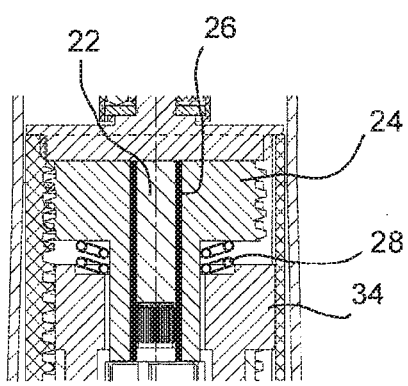
Figure 1C:
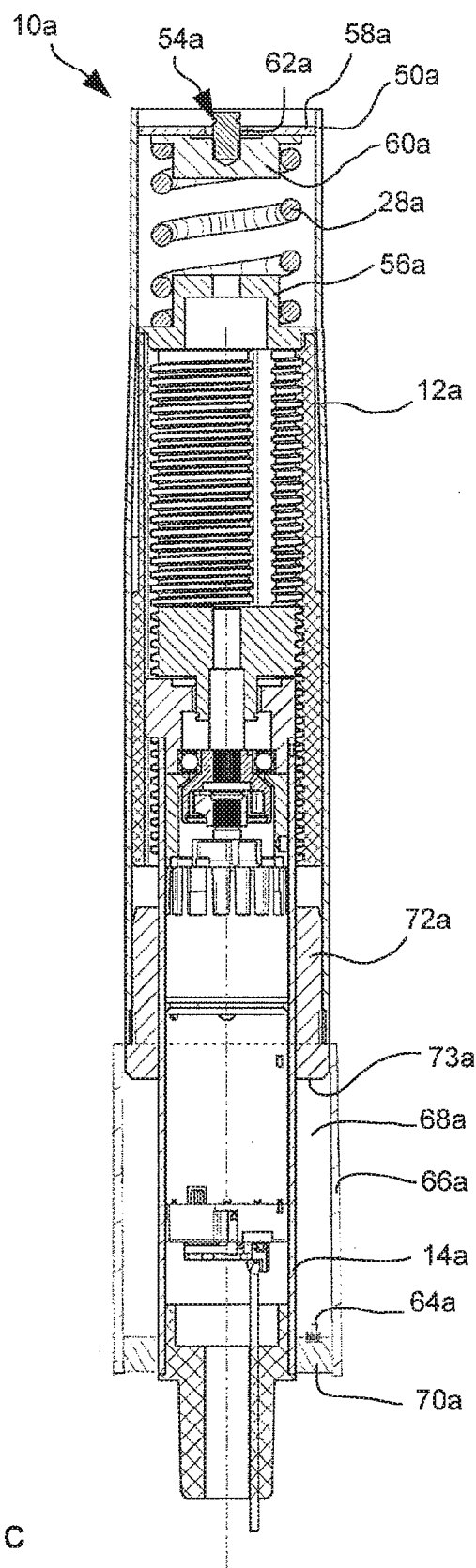
Figure 2A:
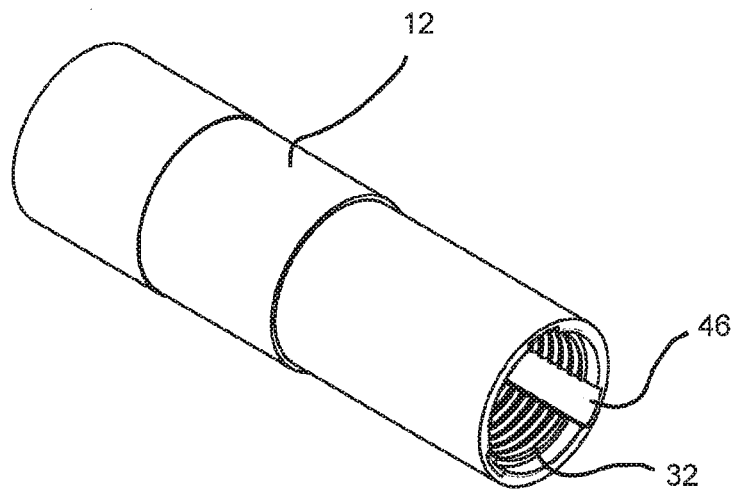
Figure 2B:
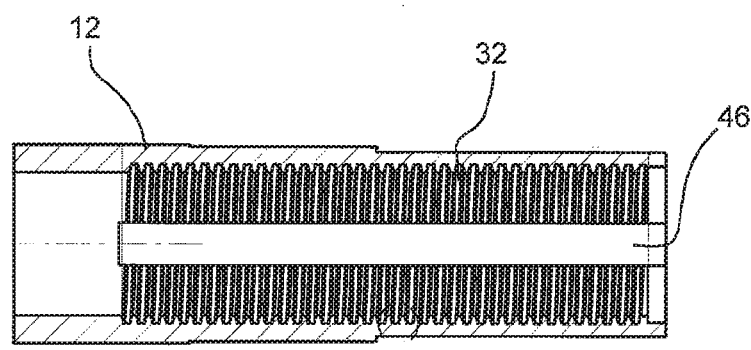
Figure 2C:
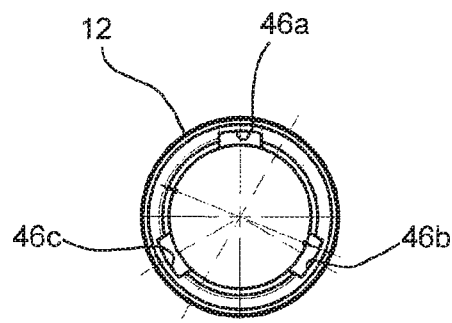
Figure 3A:
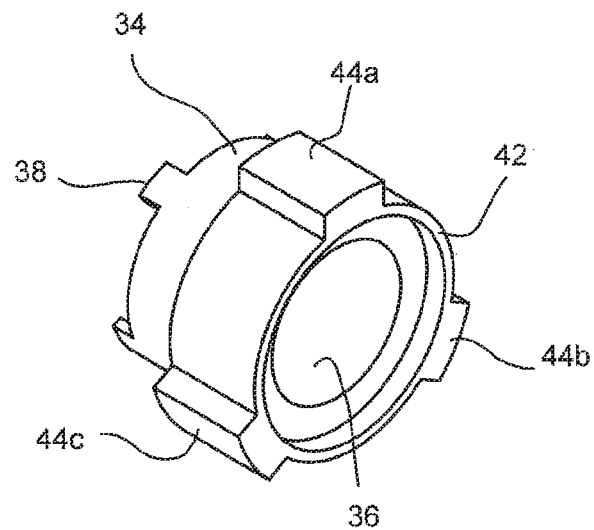
Figure 3B:
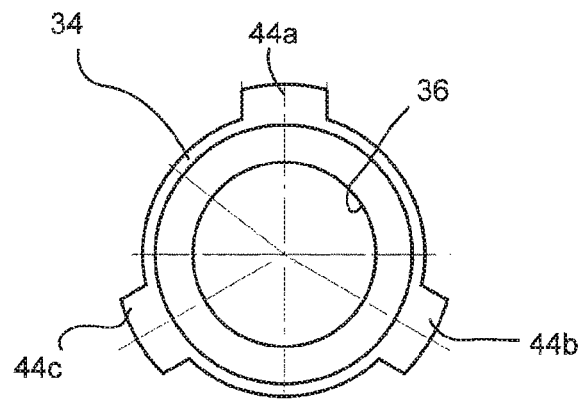
Figure 4:
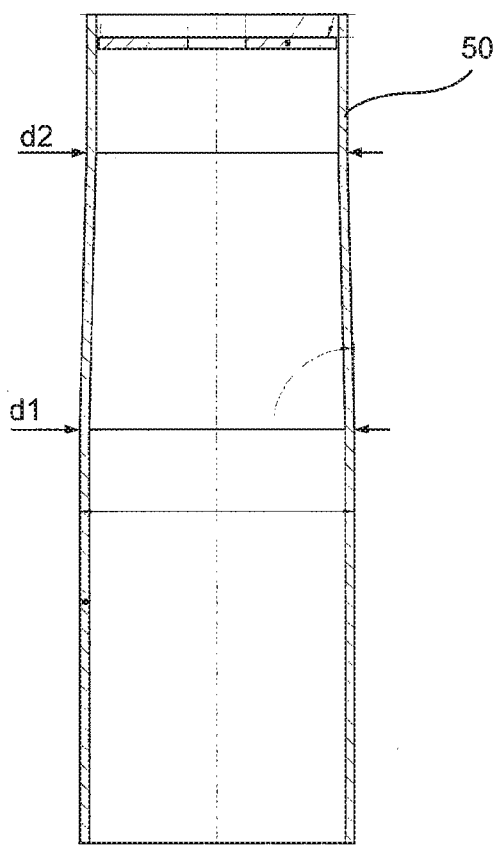
Figure 5:
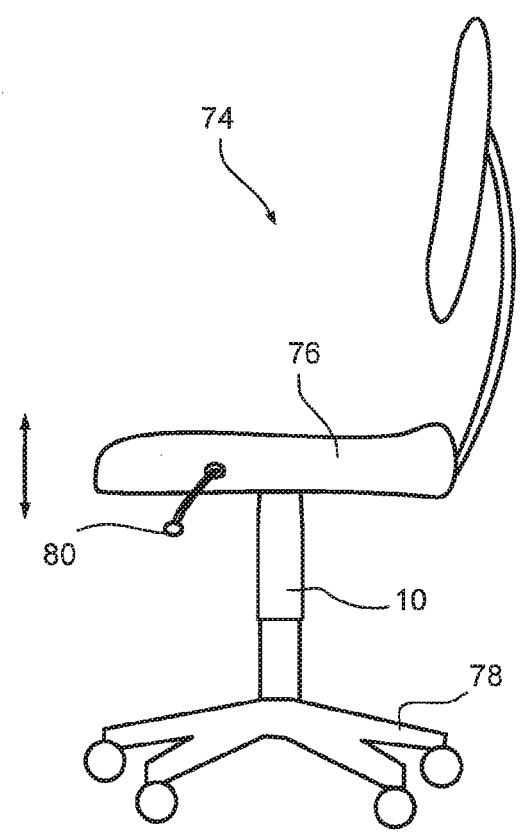

In the following, the invention is described in greater detail by way of a preferred embodiment, with reference to the accompanying drawings, in which:

FIG. 1a shows a section, containing the main axis of the screw arrangement, through a screw arrangement according to the embodiment of the present invention, FIG. 1b is a drawing corresponding to a detail from FIG. 1a, but for a different variant according to the invention, FIG. 1c shows a section, containing the main axis, through a screw arrangement according to a further variant on the invention, FIG. 2a is a perspective view of an internal sleeve of the screw arrangement according to the embodiment of the invention, FIG. 2b is a sectional view, containing the main axis, of the internal sleeve shown in FIG. 2a, FIG. 2c is an axial view of the internal sleeve shown in FIG. 2a, FIG. 3a is a perspective view of a control body of the screw arrangement according to the embodiment, FIG. 3b is an axial view of the control body shown in FIG. 3a, FIG. 4 is a sectional view, containing the main axis, of an external sleeve of the screw arrangement according to the embodiment, and FIG. 5 is a side view of a height-adjustable chair according to an embodiment of the present invention, In FIG. 1a, a screw arrangement is denoted in a general manner by reference numeral 10, and comprises a driven-side tube body 12 and a drive-side tube body 14 inserted into the driven-side tube body 12 and projecting out therefrom at one end. A drive unit 16 is accommodated in the drive-side tube body 14, and may have a motor 18 and optionally a gear unit 20 and/or a battery 21 and inputs torque to the screw arrangement at a drive shaft 22. A drive element 24 is coupled to the drive shaft 22 so as to transmit torque. In a variant according to FIG. 1a, the drive element 24 is fixed to the drive shaft 22, in such a way that both torques and axial forces are transmitted directly between the drive shaft 22 and the drive element 24.

The drive element 24 comprises an external thread 30 which is in a threaded engagement with an internal thread 32 of the driven-side tube body 12. In the axial direction, in other words in the direction of a main axis A of the screw arrangement, an extension a of the external thread 30 of the drive element 24 is less than an axial extension b of the internal thread 32 of the driven-side tube body 12. In particular, in the embodiment, it can be seen that, in the axial direction, the internal thread 32 of the driven-side tube body 12 preferably not only extends over the entire length of the drive element 24, but also covers the drive unit 16; in other words, in the contracted state shown in FIG. 1a, the drive unit 16 is also substantially fully inserted into the driven-side tube body 12.

A control body 34 may be arranged axially between the drive element 24 and the drive unit 16. The control body 34 may have a central through-opening 36 through which the drive shaft 22 passes so as to be freely rotatable. At a first axial end 38, the control body 34 may be braced against the drive unit 16, for example be positioned on an edge of a housing of the drive unit 16 (on the gear unit 20 in the embodiment shown). At a second axial end 40 opposite the first axial end 38, the control body 34 may have a support portion 42 so as to receive an axial supporting force from the drive element 24. So as to avoid excessively impeding rotation of the drive element 24 relative to the control body 34, an axial bearing, in particular a slide bearing 43, may be provided on the support portion 42, or corresponding lubrication is used. To ensure symmetrical bracing of the drive element 24, the support portion 42 extends preferably concentrically around the main axis A, or a plurality of support portions may be distributed around the main axis A.

The control body 34 may have at least one radial projection 44 which protrudes past the base of the external thread 30 of the drive element 24 in the radial direction and engages in an axial groove 46 (cf. also FIGS. 2a and 2b) which intersects the internal thread 32 of the driven-side tube body 12. This prevents relative rotation between the driven-side tube body 12 and the drive-side tube body 14, whilst axial displacement between the two components 12 and 14 is made possible.

To provide symmetrical load distribution of the above-disclosed guidance, a plurality of projections (in the embodiment, three projections 44a, 44b and 44c mutually offset at an angle of 120°) are preferably provided on the control body 34, and the projections 44a, 44b, 44c engage in associated axial grooves (for example three grooves [46a, 46b, 46c) mutually offset by 120° in the embodiment). Alternatively, two grooves or more than three grooves and a corresponding number of projections may be used.

As is shown in particular in FIGS. 1a, 1b, 2a to 2c and 4, the driven-side tube body 12 may carry an external sleeve 50, the driven-side tube body 12 being received in the outer sleeve 50 with an exact fit and having the internal thread 32 on the inside thereof. The external sleeve 50 may have conical tapering 52 at the axial end thereof remote from the drive-side tube body 14 thereof, in other words transition from a portion having a larger diameter d1 into a portion having a smaller diameter d2. Conical tapering 52 of this type provides a simple option for fixing the outer sleeve 50, for example on a chair.

The external sleeve 50, which may or may not have the above-disclosed tapering 62, can be mounted on the driven-side tube body 12 in a bearing portion 54 in such a way that the outer sleeve 50 is unable to move in the axial direction but rotatable about the main axis A relative to the driven-side tube body 12. For this purpose, the bearing portion 64 may for example have a first bearing element 56 in the form of a cover fixed to an end face of the driven-side tube body 12 and a second bearing element 58 in the form of a cover fixed to an end face of the outer sleeve 50, the first and second bearing elements preferably being rotatably held together by a ball bearing or axial bearing. This can make it possible, for example in a swivel chair, for the seat to rotate freely, irrespective of the adjusted seat height.

Furthermore, it may be desirable for the screw arrangement of the present invention to have a suspension or damping function in the axial direction. For this purpose, in a variant according to FIG. 1b, the drive shaft 22 and the drive element 24 may be coupled together by a longitudinal toothing 26 in such a way that a torque is transmitted from the drive shaft 22 to the drive element 24, but axial displacement between the drive element 24 and the drive shaft 22 is possible. This axial displacement can be controlled by a damping element 28, for example a spiral spring, which is inserted between the drive element 24 and the drive shaft 22.

In an alternative variant of a screw arrangement 10a according to FIG. 1c, a damping element 28a in the form of a spiral spring is arranged axially between the driven-side tube body 12a and the outer sleeve 50a. In this variant, a bearing portion 54a between the outer sleeve 50a and the driven-side tube body 12a is configured in such a way that the outer sleeve 50a can not only rotate relative to the driven-side tube body 12a about the main axis A, but can also be displaced axially relative to the driven-side tube body 12a. This is implemented for example in such a way that a cover 56 fixed to the driven-side tube body 12a forms a first spring stop for the damping element 28a, and an opposite spring stop 60a for the damping element 28a on a ball bearing or axial bearing 62a is held, in a rotatable and axially displaceable manner, on a second bearing element 58a fixed to the outer sleeve 50a.

In the variant according to FIG. 1c, too, the outer sleeve 50a, on which for example a seat of a chair is held, is thus freely rotatable with respect to the drive-side tube body 14 and additionally movable in the axial direction in a damped or suspended manner under the influence of the damping element 28a, irrespective of the axial position of longitudinal extension of the screw arrangement 10a.

FIG. 1c further illustrates by way of example a position detector 64a, which can detect the position of the driven-side tube body 12a or the outer sleeve 50a in the fully retracted position (length of the screw arrangement 10a at a minimum). In particular, a control unit can switch off the drive unit 16 or undertake automatic calibration of the control of the drive unit 16 on the basis of a detected signal from the position sensor 64a when the retracted position is reached. Preferably, the position detector 64a may be arranged in a protective tube 66a which extends coaxially around the driven-side tube body 14a and has a greater diameter, which leaves an annular gap 68a between the protective tube 66a and the drive-side tube body 14a. On an end of the drive-side tube body 14a remote from the driven-side tube body 12a, the protective tube 66a may be fixed by means of a holding ring 70a, the width of which determines the width of the annular gap 68a. The holding ring 70a can thus be fixed to the outer wall of the drive-side tube body 14a with an exact fit, and simultaneously be fixed to the internal wall of the protective tube 66a. Furthermore, the holding ring 70a may carry the position detector 64a.

An end-face end of the outer sleeve 50a (or alternatively of the driven-side tube body 12a) may enter the annular gap 68a and approach the position detector 64a during the contraction of the screw arrangement 10a. In order to also ensure dust-proof enclosure in this region of the screw arrangement 10a, the protective tube 66a and the annular gap 68a may have a length in the axial direction such that the outer sleeve 50a is always inserted into the protective tube 66a in every expansion position of the screw arrangement 10a. Furthermore, on the end of the outer sleeve 50a (alternatively, the end of the driven-side tube body 12a), a fitted ring 72a may be provided which is dimensioned in such a way that it slides both on the external circumference of the drive-side tube body 14a and on the internal circumference of the protective tube 66a, and substantially prevents dust from entering the annular gap. An end face 73a of the fitted ring 72a facing the position detector 64a can thus form a defined stop for contacting the position detector 64a.

It should be noted that the aforementioned features having reference numerals 64a to 73a relating to detecting an end stop can of course also be transferred, in the same or an analogous manner, to the variants according to FIGS. 1a and 1b or to other variants of the present invention.

FIG. 5 shows a seat arrangement 74 according to an embodiment of the present invention. The seat arrangement 74 comprises a seat 76, a base 78 and a screw arrangement according to the present invention (for example 10 or 10a) which interconnects the seat 76 and the base 78 and extends between the seat 76 and the base 78 in the vertical direction as a single central column. The screw arrangement 10 thus introduces substantially the entire gravitational force acting on the seat 76 during use into the base 78 in the vertical direction.

The seat arrangement 74 further comprises an operating element 80 which can be actuated by a user to adjust the height of the seat 76. For this purpose, the operating element 80 is connected in a signal-transmitting manner to the drive unit 16 of the screw arrangement 10 so as to actuate the drive unit 16 to rotate the drive element 24 and thus extract or contract the screw arrangement 10, for example via a control line 82 (see also FIG. 1a), A functionality of the screw arrangement 10, in particular in connection with the seat arrangement 74, is explained in the following.

FIG. 1a shows the fully contracted state of the screw arrangement 10, in other words, the total length of the screw arrangement 10 is minimised. As can be seen in FIG. 1, the constructional length achieved in this context is substantially determined by the axial length of the drive unit 16, whilst the additionally required axial length taken up by the drive element 24 is reduced to a minimum. In particular, the axial length of the drive element 24 is significantly less than the achievable stroke distance or the axial length of the internal thread 32 of the driven-side tube body 12.

If the drive unit 16 is actuated out of this position, for example by actuating the operating element 80 of the seat arrangement 74 in order to extract the screw arrangement 10, in other words to produce an upward movement of the seat 76, the electric motor 18 sets the drive shaft 22 in rotation in a first direction of rotation. The rotation of the drive shaft 22 is transferred to the drive element 24. The engagement of the projection 44 in the axial groove 46 prevents the driven-side tube body 12 from being co-rotated with the drive element 24, in such a way that the external thread 30 of the drive element 24 runs along in the internal thread 32 of the driven-side tube body 12 and the driven-side tube body 12 is thus forcibly displaced in the axial direction. When the drive element 24 rotates in the first direction of rotation, the driven-side tube body 12 is displaced axially in the extraction direction, in other words the total length of the screw arrangement 10 is increased, and the seat 76 is thus moved upwards.

Conversely, when the drive unit 16 is actuated to rotate the drive shaft 22 in a second direction of rotation counter to the first direction of rotation, for example as a result of the operating element 80 of the seat arrangement 74 being actuated to adjust the seat 56 downwards, the driven-side tube body 12 is axially displaced so as to contract the screw arrangement 10, in other words so as to shorten the total length of the screw arrangement 10.

The invention claimed is:

1. A screw arrangement, comprising:
   a drive unit for introducing a torque into the screw arrangement, the drive unit having an electric motor and being housed in a distal end of a drive-side tube body,
   a drive element driven in rotation about a main axis of the screw arrangement by the drive unit and having an external thread, and
   a driven element having an internal thread, which is in threaded engagement with the drive element,
   wherein an internal thread axial extension of the internal thread of the driven element is greater than an external thread axial extension of the external thread of the drive element, and wherein the drive unit, including the electric motor, and the drive element are radially disposed within the driven element.

2. The screw arrangement according to claim 1, wherein, in a contracted state of the screw arrangement, the drive unit is received inside the driven element and enclosed by the internal thread of the driven element at least in part.

3. The screw arrangement according to claim 1, wherein the drive unit provides the torque thereof at a drive shaft, the drive element being coupled to the drive shaft so as to transfer torque but be axially displaceable, and a suspension element having one or both a damping and suspension effect in the axial direction being arranged between the drive element and the drive shaft.

4. The screw arrangement according to claim 1, wherein the drive element is braced on a support portion in the axial direction, the support portion being axially fixed with respect to a housing of the drive unit or being formed by a housing of the drive unit or being formed on a drive-side tube body which receives the drive unit.

5. The screw arrangement according to claim 1, wherein a housing of the drive unit is coupled to the driven element so as to be rotationally engaged but axially displaceable.

6. The screw arrangement according to claim 5, wherein at least one projection which is rotationally engaged with the housing of the drive unit is guided in at least one axial groove of the driven element.

7. The screw arrangement according to claim 6, wherein the drive element is braced on a support portion in the axial direction, the support portion being axially fixed with respect to the housing of the drive unit or being formed by the housing of the drive unit or being formed on a drive-side tube body which receives the drive unit and wherein the support portion and the at least one projection are formed on a common control body arranged axially between the drive unit and the drive element.

8. The screw arrangement according to claim 7, wherein the drive unit provides the torque thereof at a drive shaft which passes through a through-opening in the control body.

9. The screw arrangement according to claim 1, wherein the drive unit includes one or both a gear unit and a battery for providing electrical energy for driving the electric motor and/or a control unit for the electric motor.

10. The screw arrangement according to claim 9, wherein the electric motor and said one or both the gear unit and the battery are interconnected to form a module which can be handled as a unit.

11. The screw arrangement according to claim 1, wherein the drive unit is accommodated in a drive-side tube body.

12. The screw arrangement according to claim 11, wherein the drive-side tube body has externally accessible electric contacts for one or both of actuating and powering the drive unit.

13. A seat arrangement comprising a seat height adjustment means which has a screw arrangement, comprising:
 a drive unit for introducing a torque into the screw arrangement, the drive unit having an electric motor,
 a drive element driven in rotation about a main axis of the screw arrangement by the drive unit and having an external thread, and
 a driven element having an internal thread, which is in threaded engagement with the drive element,
 wherein an internal thread axial extension of the internal thread of the driven element is greater than an external thread axial extension of the external thread of the drive element, and wherein the drive unit, including the electric motor, and the drive element are radially disposed within the driven element.

14. The seat arrangement according to claim 13, wherein the seat arrangement has a single vertical central column arranged so that substantially the entire gravitational force introduced via a seat of the seat arrangement is receivable by the central column, and the central column being formed by the screw arrangement.

* * * * *